United States Patent [19]
Drumm

[11] Patent Number: 5,825,661
[45] Date of Patent: Oct. 20, 1998

[54] METHOD AND APPARATUS FOR AUTOMATIC POST-LAYOUT OPTIMIZATION OF AN INTEGRATED CIRCUIT

[75] Inventor: Anthony DeGroff Drumm, Rochester, Minn.

[73] Assignee: International Business Machines Corporation, Armonk, N.Y.

[21] Appl. No.: 641,390

[22] Filed: May 1, 1996

[51] Int. Cl.[6] ............................ G06F 17/00; G06F 17/50
[52] U.S. Cl. ..................... 364/491; 364/488; 364/489; 364/490
[58] Field of Search .................. 364/488–491, 364/578; 395/500

[56] References Cited

U.S. PATENT DOCUMENTS

| | | | |
|---|---|---|---|
| 4,805,113 | 2/1989 | Ishii et al. | 364/491 |
| 5,218,551 | 6/1993 | Agrawal et al. | 364/491 |
| 5,237,514 | 8/1993 | Curtin | 364/490 |
| 5,367,469 | 11/1994 | Hartoog | 364/490 |
| 5,402,357 | 3/1995 | Schaefer et al. | 364/490 |
| 5,426,591 | 6/1995 | Ginetti et al. | 364/489 |
| 5,436,849 | 7/1995 | Drumm | 364/490 |
| 5,452,226 | 9/1995 | Hooper et al. | 364/489 |
| 5,461,576 | 10/1995 | Tsay et al. | 364/490 |
| 5,461,577 | 10/1995 | Shaw et al. | 364/491 |
| 5,473,547 | 12/1995 | Muroga | 364/490 |
| 5,572,437 | 11/1996 | Rostoker et al. | 364/489 |
| 5,598,344 | 1/1997 | Dangelo et al. | 364/489 |
| 5,654,898 | 8/1997 | Roetchisoender et al. | 364/490 |

FOREIGN PATENT DOCUMENTS 6345001  11/1989  Japan ........................................ 19/173

OTHER PUBLICATIONS

Ramachandran et al, "Combined Topological and Functionality–Based delay Estimation Using a Layout–Driven Approach for High–Level Applications", IEEE, 1994, pp. 1450–1460.

Hwang et al, "Exploiting Communication Complexity for Multilevel Logic Synthesis", IEEE, 1990, pp. 1017–1027.

Primary Examiner—Kevin J. Teska
Assistant Examiner—Vuthe Siek
Attorney, Agent, or Firm—Derek P. Martin; Martin & Associates LLC

[57] ABSTRACT

Automatic generation of post-layout optimization circuitry allows a computer system running an integrated circuit design tool to automatically compensate for timing errors by synthesizing circuit elements to bring the timing within specified timing constraints. A new circuit element is assigned a location without determining an allowable physical location on the integrated circuit, and all timing calculations are based on the assigned location. Then, once the timing constraints have been met by one or more new circuit elements, an incremental layout is performed to find physical locations for the new circuit elements, using the assigned locations as initial targets. By using assigned locations during timing calculations and later determining valid physical locations, many different circuit configurations may be evaluated in a short period of time, with only the best ones going through the more time-consuming step of layout and routing.

5 Claims, 9 Drawing Sheets

METHOD AND APPARATUS FOR AUTOMATIC POST-LAYOUT OPTIMIZATION OF AN INTEGRATED CIRCUIT

FIELD OF THE INVENTION

This invention generally relates to integrated circuits. More specifically, this invention relates to a method and apparatus for automatically performing post-layout optimization of an integrated circuit.

BACKGROUND OF THE INVENTION

The proliferation of modern electronics is due in large part to the development of the integrated circuit. Integrated circuits allow many different circuit elements to be implemented on a single chip. As technology advances, the number of circuit elements on a chip of a given size increases, enhancing the performance and reducing the cost of integrated circuits.

The design of integrated circuits is typically performed in two stages. The first stage is logic design, wherein the desired operation of the integrated circuit is determined. The second stage is physical design, wherein the desired operation is translated into the required circuit elements for a given technology, along with the layout and routing of these elements on the integrated circuit. Layout defines the location of the circuit elements on the integrated circuit. Routing defines interconnections between circuit elements. Each interconnection between circuit elements is referred to herein as a net.

One critical parameter in integrated circuit design is timing, which is a function of resistance and capacitance. During the logic design stage, timing parameters for each net are typically estimated using formulas that estimate resistance and capacitance of a net based on the number and type of circuit elements connected to the net. These estimates are rather gross estimates. Once physical design is completed, the required circuit elements are placed (i.e., layout) and interconnected together (i.e., routing). The timing estimates for each net may be refined after layout and routing by calculating timing based on the actual circuit configuration of a net, including resistance and capacitance that results from the physical design of the net.

Often, a design that meets timing constraints in the logic design stage will not meet some of these same constraints after the timing is refined after layout and routing. As a result, optimizations must be made after the layout of the integrated circuit (i.e., post-layout optimizations) to eliminate the timing problems that arise in the physical design stage. These optimizations include the addition or deletion of circuitry such as buffers or gates to reduce the signal delay for a problem net, thereby bringing the delay of the net within the desired timing constraints. Since the circuit elements were placed during layout, the designer of the integrated circuit typically must somewhat manually layout and route the post-layout optimization circuitry. If the designer is savvy, the manual layout and routing will fix the timing problems and provide a design that meets all timing constraints. However, this process of laying out and routing optimization circuitry is very time-consuming and requires a great deal of expertise (and some luck), and is heavily dependent on the taste, preference, and past experience of the designer.

Processes for integrated circuit design are becoming more and more automated. Without a mechanism for automating post-layout optimization, the effectiveness and time for implementing optimization circuitry will be limited by the human designers who must manually insert optimization circuitry.

SUMMARY OF THE INVENTION

According to the present invention, automatic generation of post-layout optimization circuitry allows a computer system running an integrated circuit design tool to automatically compensate for timing errors by synthesizing circuit elements to bring the timing within specified timing constraints. A new circuit element is assigned a location without determining an allowable physical location on the integrated circuit, and all timing calculations are based on the assigned location. Then, once the timing constraints have been met by one or more new circuit elements, an incremental layout is performed to find physical locations for the new circuit elements, using the assigned locations as initial targets. By using assigned locations during timing calculations and later determining valid physical locations, many different circuit configurations may be evaluated in a short period of time, with only the best ones going through the more time-consuming step of layout and routing.

The foregoing and other objects, features and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

DETAILED DESCRIPTION OF THE PREFERRED EMBODIMENT

Figure 1:
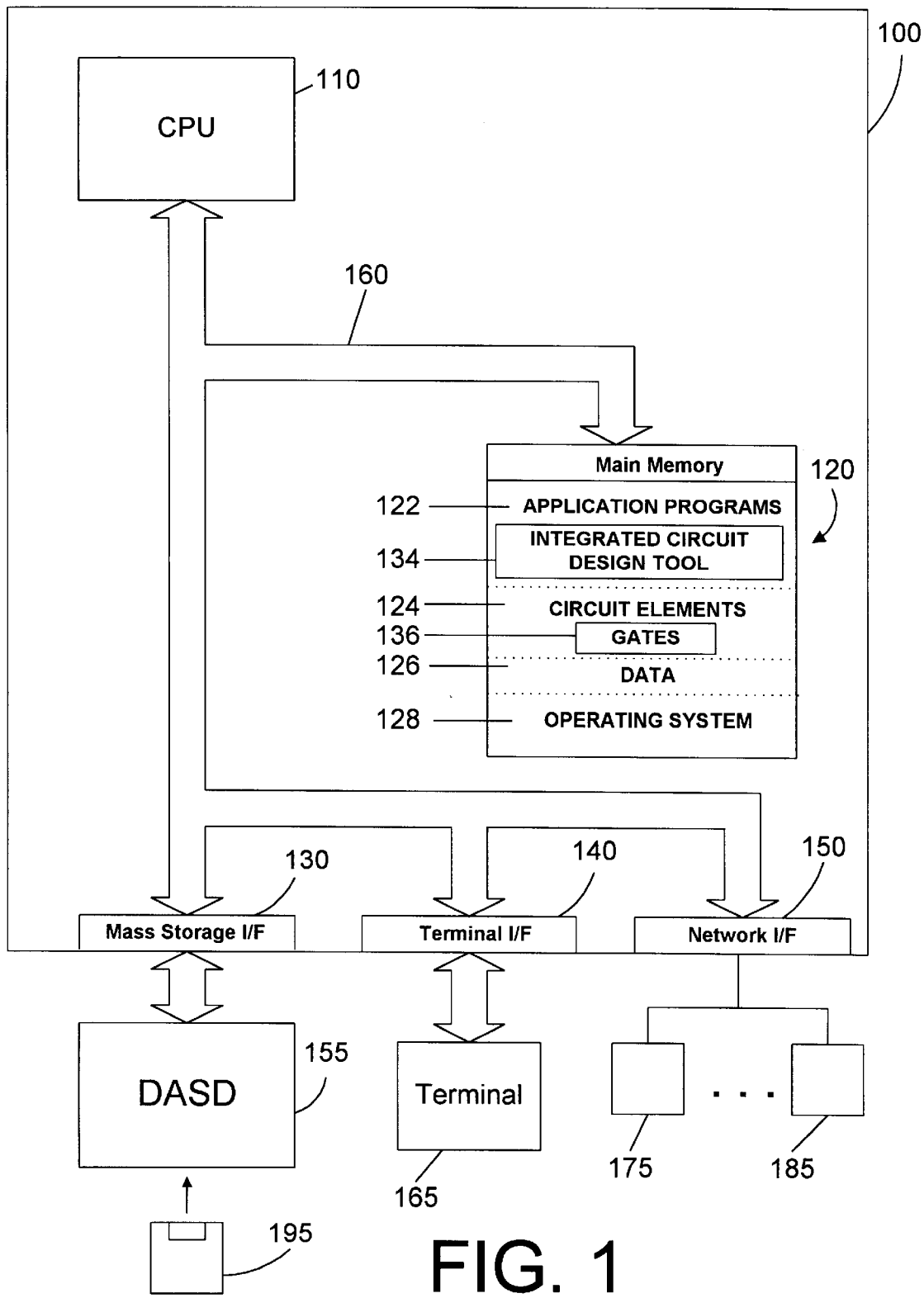
FIG. 1 is a block diagram of a computer system in accordance with the present invention.

FIG. 1 shows a block diagram of the computer system of the present invention. The computer system of the preferred embodiment is an enhanced IBM RS-6000 computer system. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 1, computer system 100 comprises a main or central processing unit (CPU) 110 connected to a main memory 120, a mass storage interface 130, a terminal interface 140, and a network interface 150. These system components are interconnected through the use of a system bus 160. Mass storage interface 130 is used to connect mass storage devices (such as DASD device 155) to computer system 100. One specific type of DASD device is a floppy disk drive, which may store data to and read data from a floppy diskette 195.

Main memory 120 contains one or more application programs 122, circuit elements 124, data 126, and an operating system 128. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while application programs 122, circuit elements 124, data 126, and operating system 128 are shown to reside in main memory 120, those skilled in the art will recognize that these are not necessarily all completely contained in main memory 120 at the same time. (It should also be noted that the term "computer system memory" is used herein to generically refer to the entire virtual memory of computer system 100.)

Operating system 128 is a suitable multitasking operating system. Those skilled in the art will appreciate that the spirit and scope of the present invention is not limited to any one operating system. Also residing in main memory 120 are one or more application programs 122 that are executed by CPU 110. One of these application programs is an integrated circuit design tool 134 in accordance with the present invention. Also included within main memory 120 are representations (e.g., electrical and timing parameters) of circuit elements 124 that are used by design tool 134. One example of a suitable circuit element is a gate 136 as shown. While integrated circuit design tool 134 and circuit elements 124 are shown residing in main memory 120, they may exist anywhere in the virtual memory space of computer 800. In addition, while circuit elements 124 are shown separate from design tool 134, these circuit elements 124 could also be provided as an integral part of integrated circuit design tool 134.

Although computer system 100 is shown to contain only a single main CPU and a single system bus, those skilled in the art will appreciate that the present invention may be practiced using a computer system that has multiple CPUs and/or multiple buses. In addition, the interfaces that are used in the preferred embodiment each include separate, fully programmed microprocessors that are used to off-load compute-intensive processing from CPU 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent or fully programmable workstations, are used to allow system administrators and users to communicate with computer system 100.

Network interface 150 is used to connect other computer systems and/or workstations (e.g., 175 and 185 in FIG. 1) to computer system 100 in networked fashion. The present invention applies regardless of whether network interface 150 is present or not. For the purposes of the preferred embodiment herein, network interface 150 is present, and the present invention applies equally no matter how computer system 100 may be connected to other computer systems and/or workstations, regardless of whether the connection(s) is made using present-day analog and/or digital techniques or via some networking mechanism of the future. It is also important to point out that the presence of network interface 150 within computer system 100 means that computer system 100 may engage in cooperative processing with one or more other computer systems or workstations. Of course, this in turn means that the programs shown in main memory 120 need not necessarily all reside on computer system 100. For example, one or more programs of application programs 122 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been (and will continue to be) described in the context of a fully functional computer system, those skilled in the art will appreciate that the present invention is capable of being distributed on any signal bearing media, such as a program via floppy disk (e.g., 195 of FIG. 1), CD ROM, or other form of recordable media, or via any type of electronic transmission mechanism.

The remainder of this specification describes how the present invention improves the process of designing an integrated circuit by providing a computer system and associated method to automatically layout and route post-layout optimization circuitry. Those skilled in the art will appreciate that the present invention applies equally to any computer-based process for designing integrated circuits.

Figure 2:
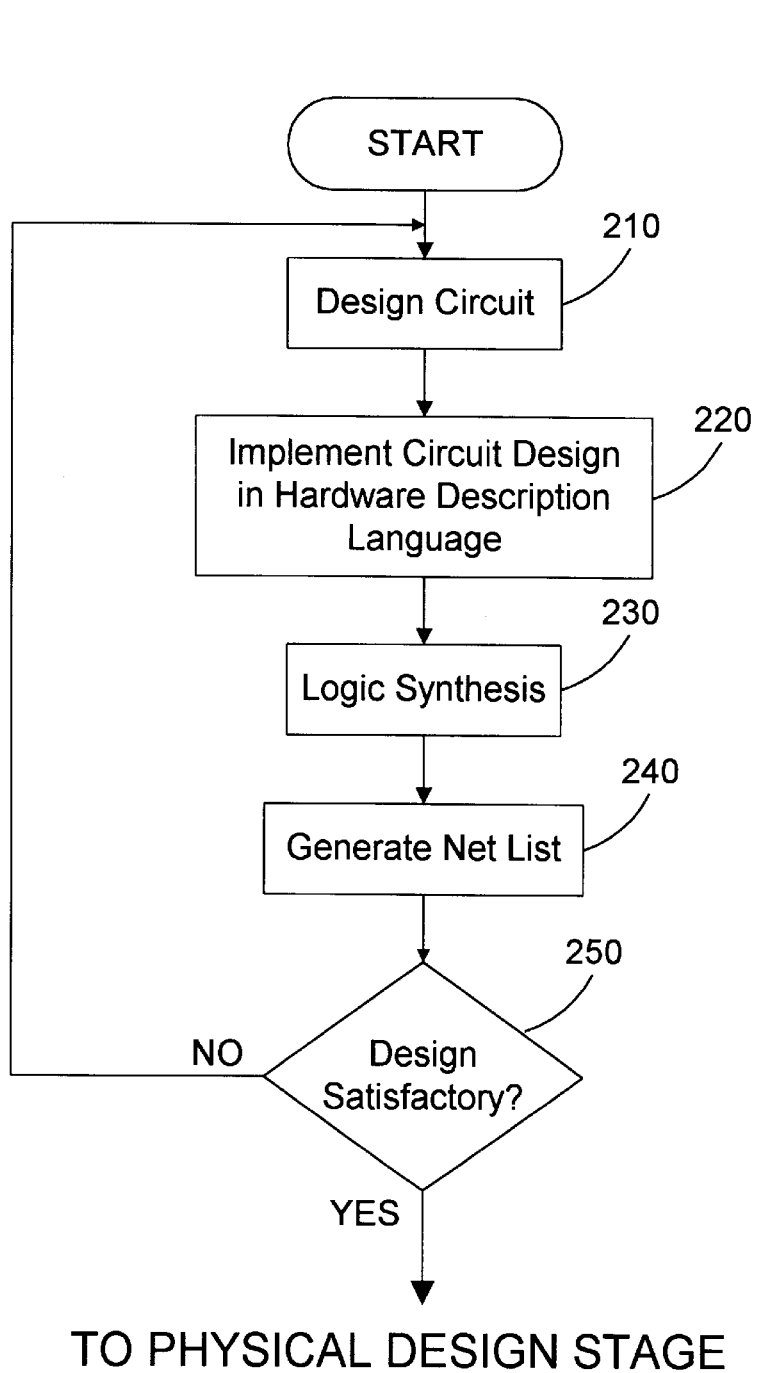
FIG. 2 is a flow diagram of one logic design stage for an integrated circuit tool.

Many different computer-based design tools 134 exist for designing integrated circuits. As discussed in the Background section, design tools typically operate in two distinct stages, the logic design stage, followed by the physical design stage. Referring to FIG. 2, the logic design stage for one particular type of computer-based integrated circuit design tool begins with the step of designing the circuit (step 210). Once the circuit is designed, the circuit design is implemented in a suitable hardware description language (step 220), such as VHDL or Verilog. The next step is logic synthesis (step 230), which, among other things, estimates the timing for each net in the circuit based on the number and type of circuit elements connected to the net. Once the logic synthesis is complete, a net list is generated (step 240), which represents a detailed listing of all circuit elements and their interconnections to implement the circuit design. If the performance of the circuit during logic synthesis indicates that the design will not work as desired (step 250=NO), the logic design stage must be repeated. If the performance is satisfactory (step 250=YES), the design tool then proceeds to the physical design stage.

Figure 3:
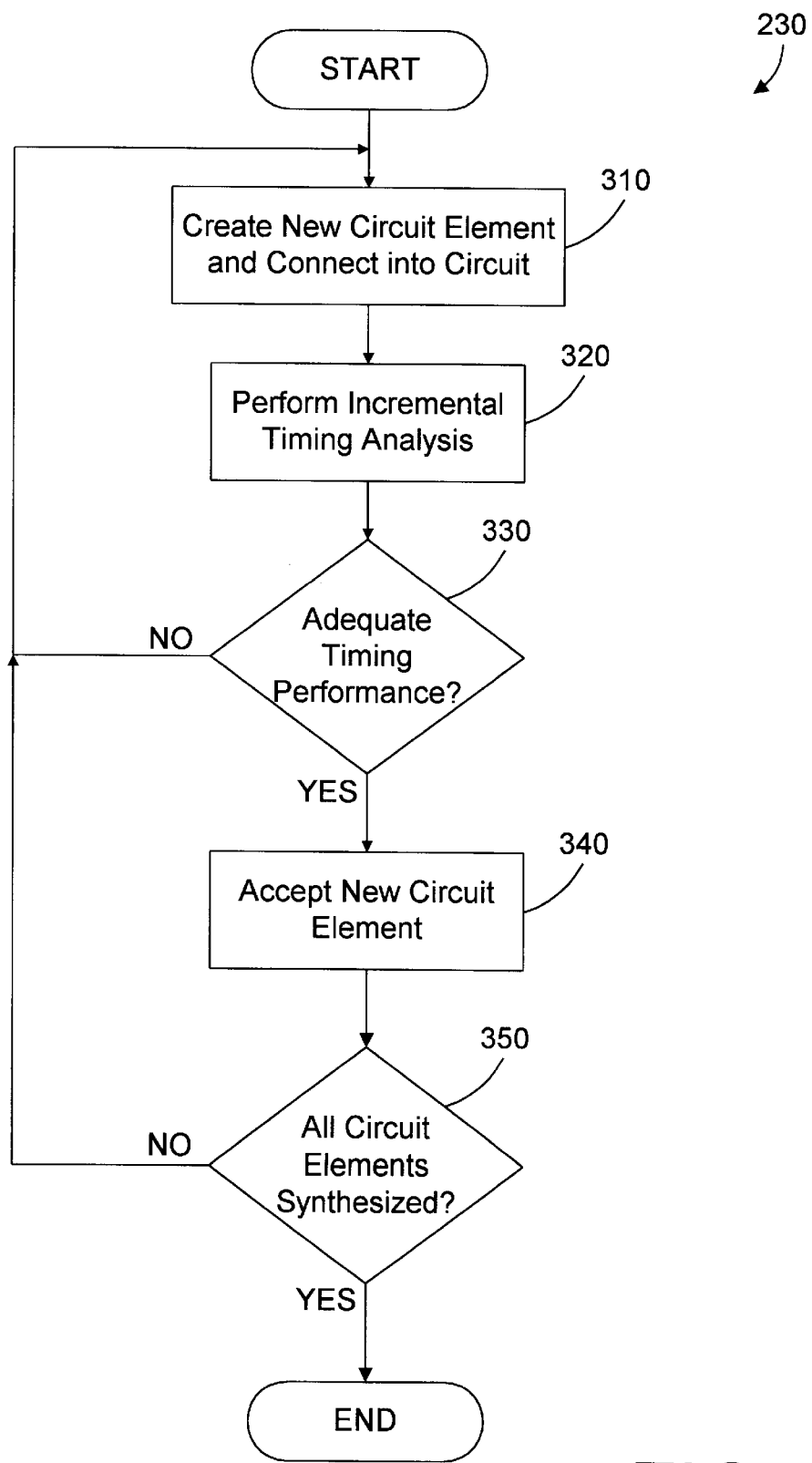
FIG. 3 is a flow diagram of the logic synthesis step of FIG. 2.

Details of a suitable logic synthesis step 230 of FIG. 2 are illustrated in the flow diagram of FIG. 3. A new circuit element is created and connected to the appropriate nets in the circuit (step 310). Next, an incremental timing analysis is performed (step 320) to determine the timing effects of adding the new circuit element. If the new circuit element meets desired timing constraints (step 330=YES), the new circuit element is accepted (step 340) in the synthesized circuit design. If the new circuit element does not meet the desired timing constraints (step 330=NO), the process is repeated with a different circuit element until the timing performance is adequate (step 330=YES). Once all circuit elements in the circuit design have been synthesized (i.e., have been accepted into the synthesized circuit design) (step 350=YES), the logic synthesis step 230 is complete. Note that the logic synthesis step 230 may perform many steps and functions other than those shown, but the steps shown in FIG. 3 and described herein are those steps that are most pertinent in relation to the timing constraints of the integrated circuit.

Figure 4:
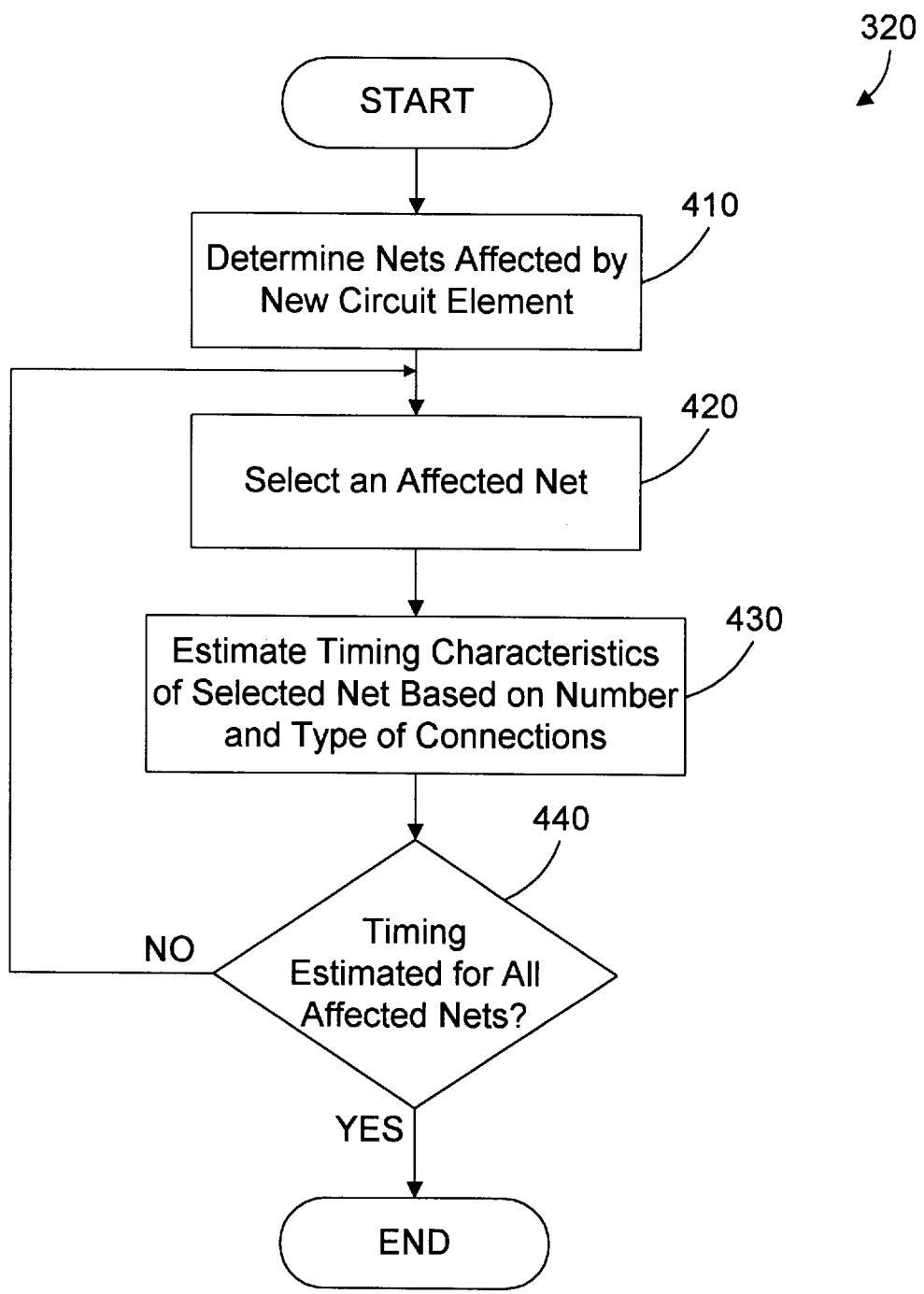
FIG. 4 is a flow diagram of the incremental timing analysis step of FIG. 3.

The details of one suitable incremental timing analysis step 320 of FIG. 3 are illustrated in FIG. 4. In general, an incremental timing analysis step may perform a variety of functions that are not shown in FIG. 4, including the determination of which delays need to be recalculated and in what order. Only the aspects of an incremental timing analysis step 320 that are most relevant to the present invention are disclosed in FIG. 4. An incremental timing analysis 320 is performed by first determining which nets are affected by the addition of the new circuit element (step 410), and in which order the timing characteristics (or delay) of the affected nets must be computed. One of the affected nets is selected (step 420), and the timing characteristics of the selected net are estimated based on the number and type of connections on the net (step 430). This timing estimate is a rough estimate, based solely on the number and type of connections on the net. If there remain other affected nets that need timing estimates (step 440=NO), the next net is selected (step 420), and timing is estimated for that net based again on the number and type of connections on that net (step 430). Once all affected nets have been processed and estimated timing characteristics for each affected net have been computed (step 440=YES), the incremental timing analysis is complete.

Figure 5:
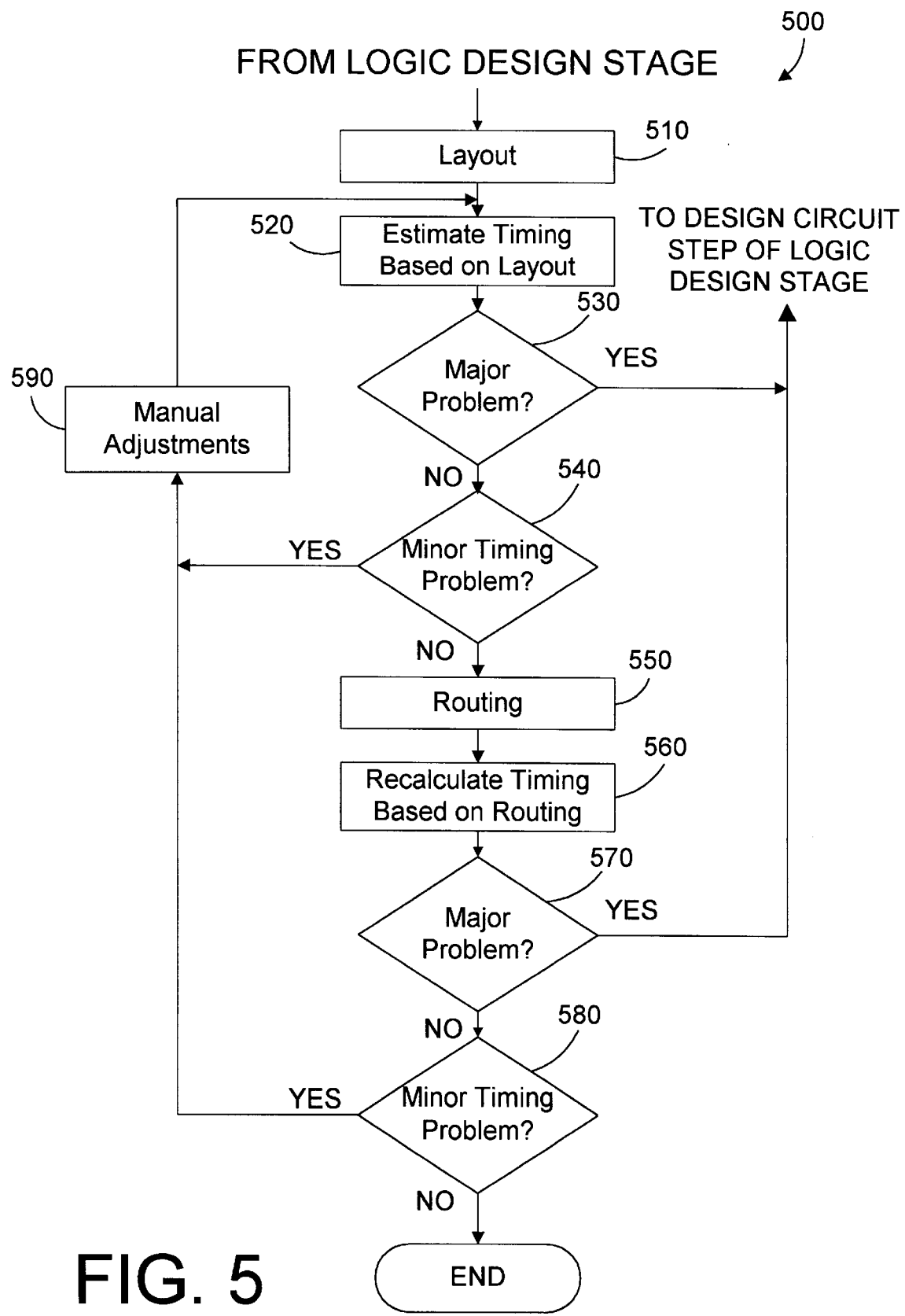
FIG. 5 is a flow diagram of one physical design stage for an integrated circuit tool that requires manual adjustments.

Referring to FIG. 5, following the logic design stage (e.g., stage 200 of FIG. 2) comes the physical design stage, during which the circuit behavior from the logic design stage is implemented into circuit elements on an integrated circuit. The net list generated in step 240 of FIG. 2 includes a list of all required circuit elements to implement the circuit that resulted from the logic design stage. These elements are placed in appropriate positions on the integrated circuit substrate during layout (step 510). Once the layout is complete, a more precise timing estimate is performed (step 520). A more precise timing estimate is possible by making estimations of signal length given the layout of circuit elements, which produces an estimate of electrical characteristics for each net in the circuit. This more precise estimate may reveal one or more problems with the physical design. If a major problem exists (step 530=YES), the physical design has failed, and the designer will have to return to the logic design stage and start over again, and may be required to design the circuit using a different set of parameters (such as a larger integrated circuit die size or a different process technology). At this stage, a problem is a major problem if the problem may not be easily fixed with manual adjustments. Thus, a major problem may be one or two severe timing problems, may be a multitude of timing problems that would make manual adjustments of all the problems impractical, or may be any other problem that makes manual adjustments by the integrated circuit designer impractical.

If no major problems exist (step 530=NO), then an analysis is performed to detect minor timing problems (step 540). If minor timing problems are present (step 540=YES), the designer must make manual adjustments to the physical design (step 590) as discussed in more detail below. If no minor timing problems exist (step 540=NO), routing interconnects all the circuit elements with signal lines or "wires" (step 550). When the routing is complete, another timing analysis is performed (step 560), but this time the timing analysis is based on the exact topology of the nets now that the topology has been defined by routing the wires on the integrated circuit. The physical design is once again checked for major problems (step 570) and minor problems (step 580). If there are no major problems (step 570=NO) and no minor timing problems (step 580=NO), the design of the integrated circuit is complete. However, if any differences between the rough timing estimates (e.g., in step 430 of FIG. 4) and the more precise timing estimates (e.g., step 560 of FIG. 5) reveal only minor timing problems (step 580=YES), the designer may then make manual adjustments (i.e., post-layout optimizations) (step 590) to correct these timing problems. Timing problems may be corrected by a variety of different methods, including the insertion or deletion of circuit elements that will fix the timing problems. One example of adjustments the designer may make is reducing the delay in long signal lines by inserting a gate or buffer at an approximate half-way point in the signal run. Since delay in a signal run is proportional to the resistance times the capacitance (RC), and both resistance and capacitance are proportional to the length of the run, the delay is proportional to the square of the length of the run. Thus, by cutting the length of a signal line in half by inserting a buffer or gate, the delay in each half of the run is approximately one-fourth its previous delay. Typically the designer will determine a location for the buffer or gate manually, and will route the connections to the buffer or gate manually as well. An experienced designer may effectively use this manual procedure to compensate for a variety of different timing problems, but this manual procedure is only as good as the experience and intelligence of the designer performing the manual layout and routing of the post-layout optimization circuitry.

Figure 6:
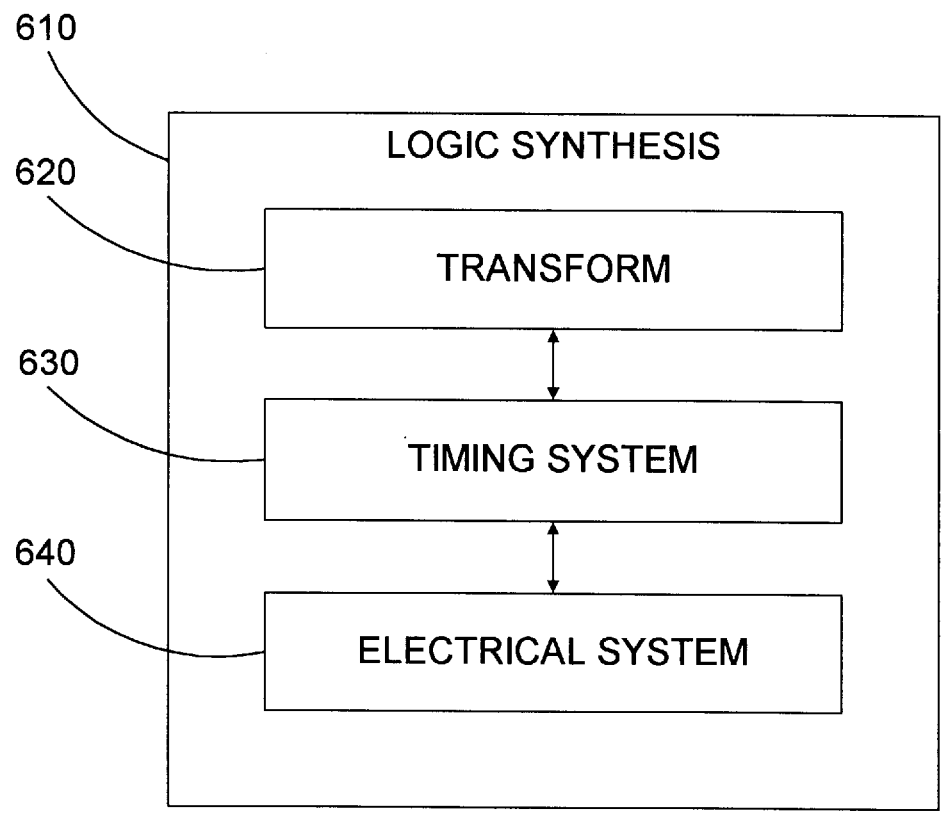
FIG. 6 is a block diagram showing the components within the logic synthesis code block that performs the logic synthesis step in FIG. 2.

Referring to FIG. 6, one particular design of a logic synthesis block 610 of computer code includes different program modules. These program modules include one or more transforms 620, a timing system 630, and an electrical system 640. In general terms, the transform module 620 inserts a circuit element, then requests updated timing information from the timing system 630 to determine the effect on timing of the added circuit element on the rest of the circuit. When the timing system 630 receives a request for timing information from a transform, it, in turn, generates a request to the electrical system 640 for the electrical characteristics (e.g., resistance and capacitance) that determine the timing of the affected nets. The electrical subsystem 640 returns estimates of electrical characteristics to the timing system 630, which then computes and passes the timing information to the transform 620.

Figure 7:
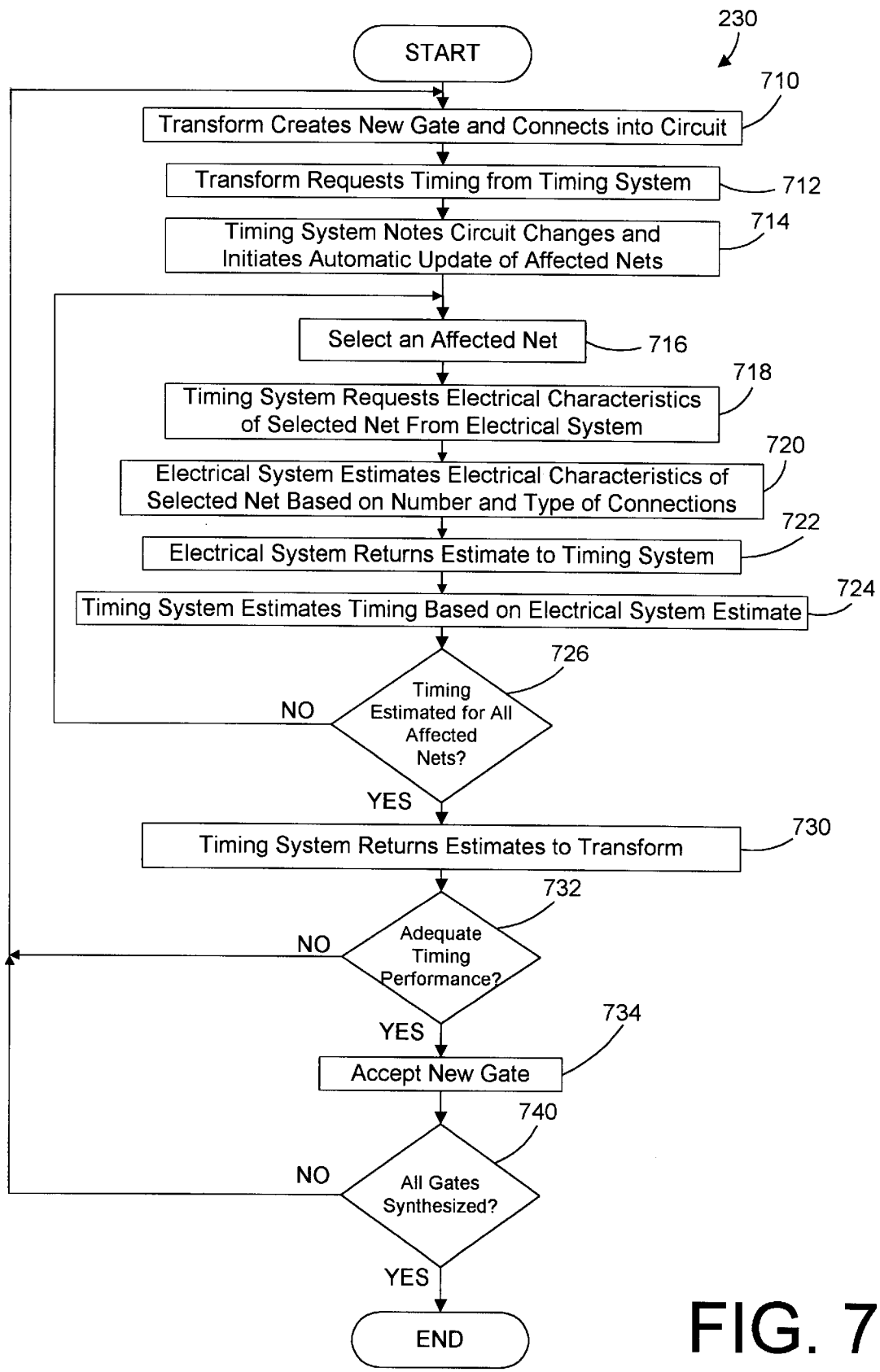
FIG. 7 is a flow diagram of the logic synthesis step of FIG. 2 for the specific configuration of logic synthesis shown in FIG. 6.
Figure 8:
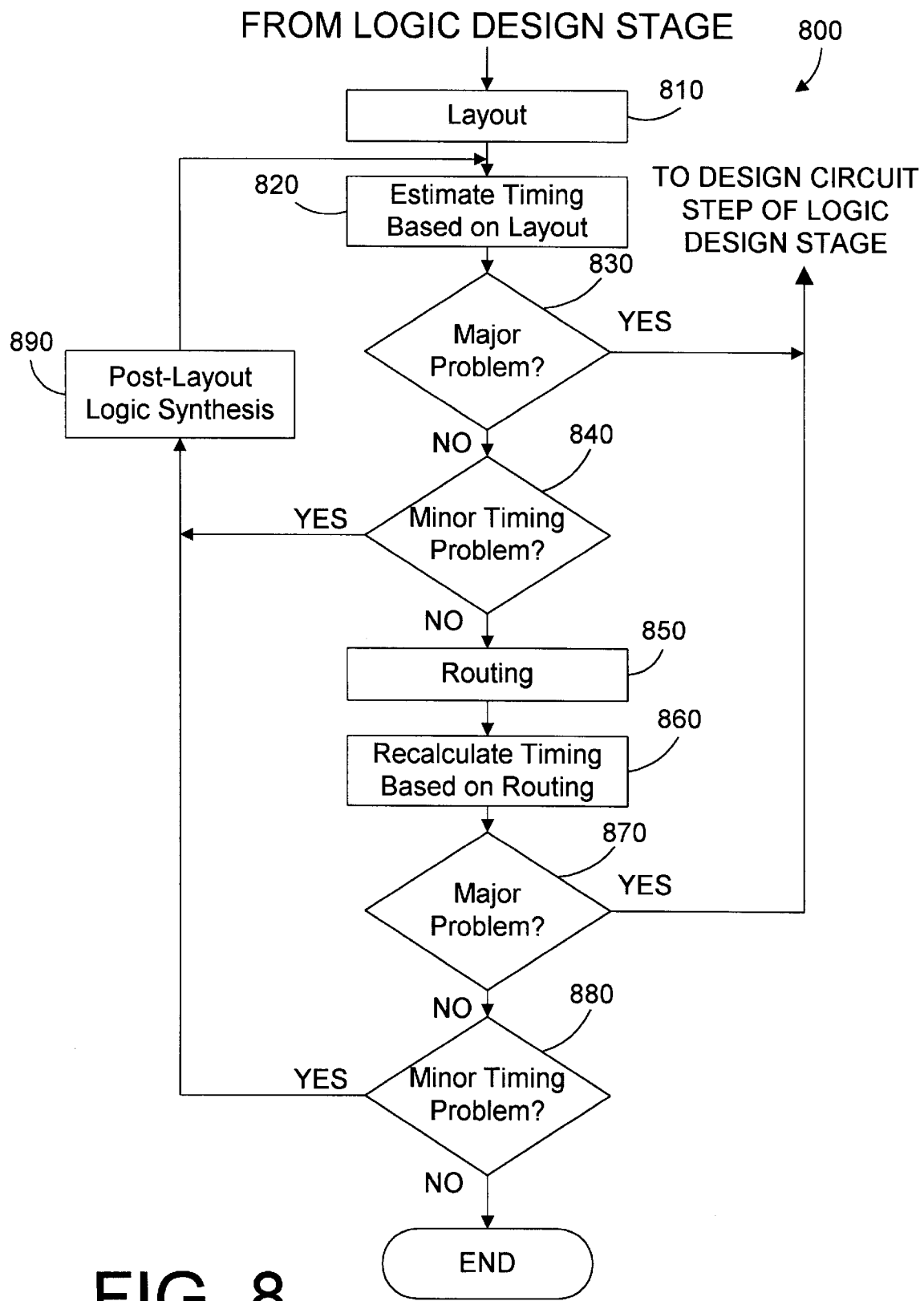
FIG. 8 is a flow diagram of a physical design stage for an integrated circuit tool in accordance with a preferred embodiment of the present invention.
Figure 9:
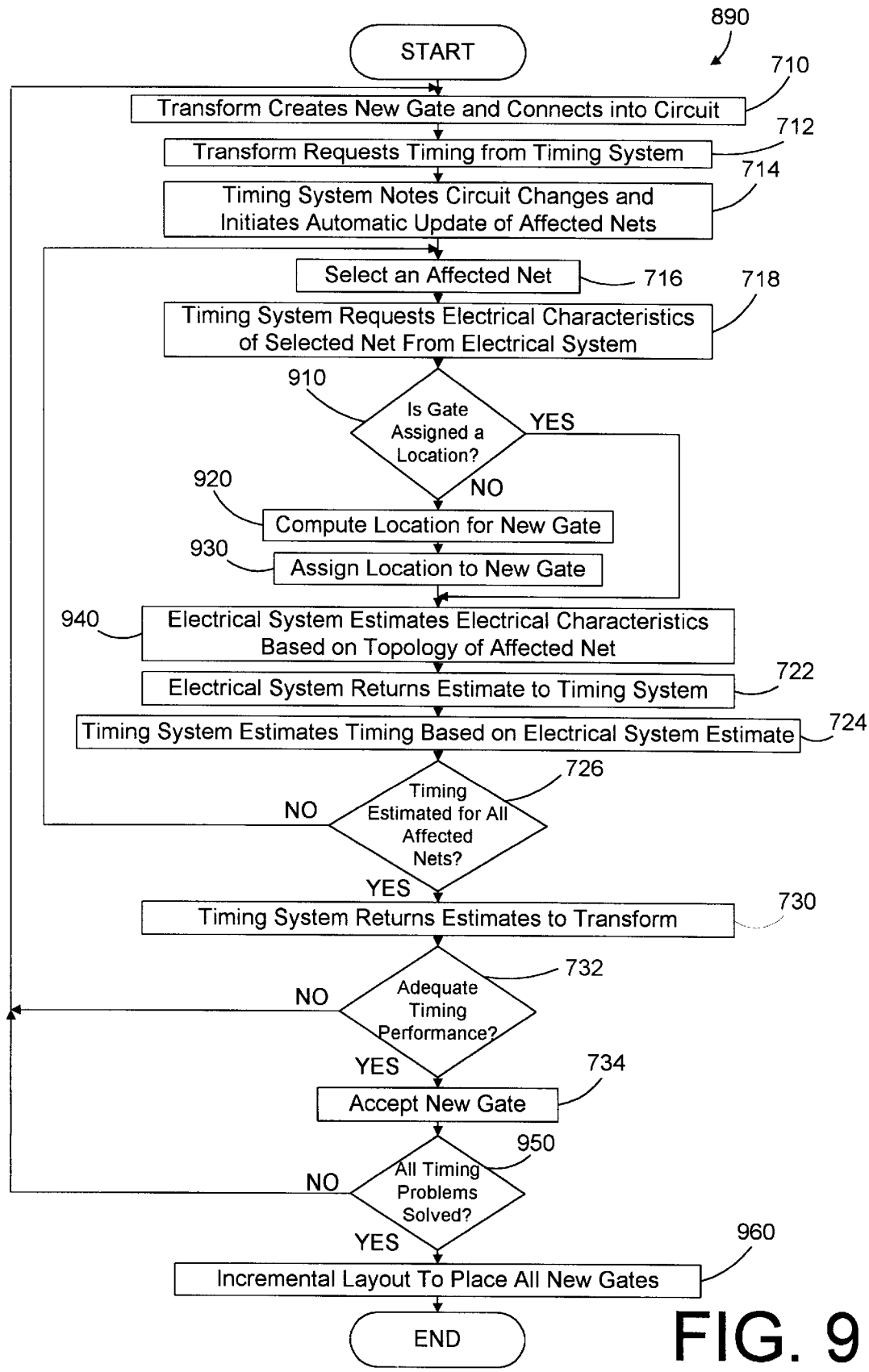
FIG. 9 is a flow diagram of the post-layout logic synthesis step of FIG. 8.

The particular operation of the preferred embodiment of the integrated circuit tool as disclosed in FIGS. 6–9 assumes that an application-specific integrated circuit (ASIC) is being designed. It is also assumed that the specific circuit elements that are available in the ASIC are gates. For this reason the discussion in FIGS. 7–9 is in the context of placing gates within an ASIC. In a different context, the circuit elements could include individual transistors. In yet another context, the circuit elements could include cells. The invention extends to the design of any type of integrated circuit, and is not limited by the discussion herein to ASIC design.

During the logic design stage (i.e., 200 of FIG. 2), the logic synthesis step 230 for the specific configuration 610 of logic synthesis is shown in more detail in FIG. 7. First, transform 620 creates a new gate and connects it into the circuit (step 710). Transform 620 then requests timing information from timing system 630 (step 712). Timing system 630 notes the circuit changes that result from adding the new gate, and initiates automatic update of affected nets (step 714). An affected net is selected (step 716). Next, timing system 630 requests electrical characteristics of the selected net from electrical system 640 (step 718). In response to this request, electrical system 640 estimates the electrical characteristics (e.g., resistance and capacitance) of the selected net based solely on the number and type of connections on the net (step 720). The electrical characteristics are returned by electrical system 640 to timing system 630 (step 722). Timing system 630 then computes timing from the electrical characteristics (step 724). If there are affected nets that do not yet have timing estimates (step 726=NO), the next affected net is selected (step 716), and the process (steps 718–724) is repeated, until timing has been estimated for all nets that are affected by the new gate (step 726=YES). Once all affected nets have estimated timing due to the change, timing system 630 returns the timing estimates to transform 620 (step 730). The estimated timing is then compared with the timing constraints of the circuit design. If the estimated timing is not within the appropriate timing constraints (step 732=NO), the new gate is discarded and the process is repeated for a different new gate. If, however, the estimated timing is within the required timing constraints (step 732=YES), the new gate is accepted (step 734) into the synthesized design. If more gates remain in the design that need to be synthesized (step 740=NO), the process is repeated for the new gate. Once all gates in the design have been synthesized (step 740=YES) (i.e., have been accepted in step 734), the logic synthesis step 230 is complete.

Referring to FIG. 8, a physical design stage 800 in accordance with a preferred embodiment of the present invention improves upon the physical design stage 500 (of FIG. 5) by providing for automatic post-layout optimizations (step 890) rather than manual adjustments (step 590 of FIG. 5). Physical design stage 800 is very similar to physical design stage 500. First, layout places all the gates on the integrated circuit (step 810). Next, the timing is estimated from estimates of the signal length based on the layout (step 820). The physical design is then checked for major problems (step 830). If no major problems are present (step 830=NO), the physical design is checked for minor timing problems (step 840). If no minor problems are encountered (step 840=NO), the signal wires are then routed (step 850). The timing is then recalculated using the exact net topology that resulted from routing (step 860). If a major problem exists (step 870=YES), the logic design stage must be started again. Note that a major problem in this context is different than a major problem in the physical design stage that uses manual adjustments as shown in FIG. 5. For example, as discussed above, a large number of minor timing problems may be a major problem if the integrated circuit designer has to manually fix all the problems, causing the designer to rethink his or her design. In the context of a method and apparatus for automatically generating post-layout optimization circuitry, however, a large number of minor timing problems may not present a major problem since method 800 could potentially automatically find solutions to most or all of these problems. If method 800 automatically attempts to fix the large number of minor timing problems and is unable to fix enough of these minor timing problems, then the group of unresolved minor timing problems becomes a major problem, and the integrated circuit designer will return to the logic design stage to improve the design.

If there are no major problems (step 870=NO) nor minor timing problems (step 880=NO), the logic design stage is done, thereby completing the design of the integrated circuit. If, however, there are no major problems (step 870=NO) but there are some minor timing problems (step 880=YES), a post-layout logic synthesis step 890 is performed to automatically generate the required post-layout optimization circuitry.

The specific design of the logic synthesis code 610 as shown in FIG. 6 allows for using the same logic synthesis code in the post-layout logic synthesis step 890 as was used in the logic synthesis step 230 during the logic design stage 200 (see FIG. 2). Specifically, the steps of post-layout logic synthesis (step 890) are shown in more detail in FIG. 9. Note that the steps 710–718 and 722–734 are the same as the corresponding steps in the logic synthesis step 230 that occurs during the logic design stage shown in FIG. 7. The commonality in steps illustrates the portions of the logic synthesis code that may be used for both logic synthesis in the logic design stage (step 230) and post-layout logic synthesis (step 890). The primary difference is how electrical system 640 estimates electrical characteristics. In the logic design stage, electrical system 640 estimates electrical characteristics based solely on the number and type of connections on a net (step 720 of FIG. 7). However, in the case of using the logic synthesis code for post-layout logic synthesis, when a new gate is created and connected into the circuit, it has no location since the need for the gate was identified post-layout. As a result, electrical system 640 will attempt to compute the electrical characteristics of the affected net only to discover that the new gate has not yet been placed. Thus, for the first pass after creating a new gate, the gate will not yet be assigned a location (step 910=NO). As a result, electrical system 640 will compute a location for the new gate using a suitable heuristic, without necessarily determining whether the computed location is an available location on the integrated circuit (step 920). For example, for a single gate, the location for the new gate may be based on the average of the locations of the pins on all nets connected to the new gate. If two gates are added in sequence, the locations of the two gates can be computed using a weighted average that accounts for the multiple unplaced elements. In computing the location, electrical system 640 could check a list of large blocks of circuitry (such as RAM or ROM arrays) to assure the gate is not given a location in these regions. By estimating gate location without determining the exact physical position of the gate, the post-layout logic synthesis 890 may explore a large number of alternatives and fix a large number of problems in a reasonable amount of time.

The new gate is assigned the computed location (step 930) for all subsequent timing estimates for nets that are affected by insertion of the new gate. Electrical system 640 then estimates the electrical characteristics for the net based on the topology of the net (step 940), without regard to the fact that the new gate may be located in an illegal location. The rest of steps 722–734 are the same as described in relation to FIG. 7. Note that when a second and subsequent affected nets are selected (step 716) for a given gate, the gate has already been assigned a location (step 910=YES), so electrical system 640 will use the previously assigned location in estimating the electrical characteristics of the affected net of interest.

If the timing returned to transform 620 by timing system 630 is within timing constraints (step 732=YES), the new gate is accepted (step 734). Once a new gate is accepted, a check is made to see if all the timing problems have been solved (step 950). If not (step 950=NO), the process will be repeated, and another gate (i.e., additional post-layout optimization circuitry) will be created and inserted into the circuit. Once all timing problems have been solved (step 950=YES), an incremental layout step places all the new gates (step 960), using the assigned location of each gate as its initial target for placement. While the final placement may vary from the location assigned, the two are generally close enough to validate the results of the changes necessitated by the post-layout optimization circuitry.

As the steps in FIG. 9 illustrate, logic synthesis code 610 suitably includes the same code for transform 620 and timing system 630. The primary difference is in electrical system 640, which must know whether the logic synthesis is in the logic synthesis step 230 in logic design stage 200 or in the post-layout logic synthesis step 890 in physical design stage 800, and change its operation accordingly (as illustrated in FIGS. 7 and 9). The best mode for the invention herein is to provide a body of common code in the logic synthesis code 610 that may be used in both the logic design stage as well as during post-layout optimizations. However, it is clearly within the scope of the present invention to provide code in the post-layout optimization stage that is unique compared to the logic synthesis code used in the logic design stage of the design process.

The computer system 100 and method 800 in accordance with the present invention provide a powerful tool for designing integrated circuits by automating the time-consuming and laborious task of manually placing and routing post-layout optimization circuitry. Computer system 100 includes an integrated circuit design tool 134 that has the capability to automatically generate post-layout optimization circuitry by performing a logic synthesis step after layout and routing is complete. In this manner, computer system 100 may automatically assign locations (although not necessarily valid locations) to gates used in the post-layout optimization circuitry. Then, once all gates needed for post-layout optimization have been assigned, computer system 100 may perform an incremental layout to place the gates in valid locations, using the assigned locations as initial targets. This method of automatically generating post-layout optimization circuitry drastically improves the time for designing an integrated circuit by eliminating the need for the integrated circuit designer to manually place and route these circuits.

While the invention has been particularly shown and described with reference to preferred exemplary embodiments thereof, it will be understood by those skilled in the art that various changes in form and details may be made therein without departing from the spirit and scope of the invention.

I claim:

1. A computer-implemented method for synthesizing post-layout optimization circuitry for an integrated circuit design after the layout of functional circuitry on the integrated circuit is complete, the integrated circuit design including a set of timing constraints that must be met for the integrated circuit to operate correctly, the method including the steps of:

(A) automatically generating a new circuit element that changes the timing of at least one of a plurality of nets within the integrated circuit, the new circuit element being an addition to the functional circuitry;

(B) inserting the new circuit element into the integrated circuit design in an assigned location that is anticipated to improve the timing of the integrated circuit design without determining an allowable physical location for the new circuit element;

(C) recalculating the timing for at least one of the plurality of nets within the integrated circuit design based on the topology of the net as determined by the insertion of the new circuit element at the assigned location;

(D) determining whether the recalculated timing violates the timing constraints;

(E) accepting the new circuit element if the recalculated timing improves the timing performance of the integrated circuit design in light of the timing constraints, and discarding the new circuit element if the recalculated timing does not improve the timing performance of the integrated circuit design in light of the timing constraints;

(F) repeating steps A–E until one of the following occurs: the recalculated timing is within the timing constraints; the recalculated timing is the closest to the timing constraints as possible while still violating the timing constraints after a predetermined number of repetitions of steps A–E;

(G) determining an allowable location for each accepted new circuit element using the corresponding assigned location as an initial target.

2. The method of claim 1 wherein the layout of the functional circuitry remains substantially unchanged during steps (A) through (F).

3. A method for designing an integrated circuit in a manner that automatically generates post-layout optimization circuitry, when necessary, after the layout of functional circuitry on the integrated circuit is complete, to compensate for at least one timing problem in the integrated circuit, the method comprising the steps of:

(A) synthesizing a logic design for an integrated circuit using an integrated circuit design tool executing on a computer system, the integrated circuit design tool having a plurality of software modules;

(B) providing a set of timing constraints that must be met for the integrated circuit to operate correctly;

(C) generating a physical design for the integrated circuit, the step of generating the physical design including the steps of:

(1) laying out at least one circuit element to implement the logic design;

(2) estimating the timing for at least one signal coupled to the at least one circuit element based on estimated path lengths as determined by the layout;

(3) determining whether the estimated timing violates the timing constraints;

(4) routing a plurality of nets to interconnect the at least one circuit element;

(5) calculating the timing for at least one of the nets based on the physical characteristics of the net as determined by the routing;

(6) determining whether the calculated timing violates the timing constraints;

(7) if the calculated timing violates the timing constraints, synthesizing the post-layout optimization circuitry by performing the steps of:

(7A) automatically generating a new circuit element that is an addition to the at least one circuit element that implements the logic design;

(7B) inserting the new circuit element into the integrated circuit in an assigned location that is anticipated to improve the calculated timing without determining an allowable physical location on the integrated circuit for the new circuit element;

(7C) recalculating the timing for at least one of the nets based on the topology of the net as determined by the insertion of the new circuit element at the assigned location;

(7D) determining whether the recalculated timing violates the timing constraints;

(7E) accepting the new circuit element if the recalculated timing is closer to the timing constraints than the calculated timing, and discarding the new circuit element if the recalculated timing is not closer to the timing constraints than the calculated timing;

(7F) repeating steps 7A–7E until one of the following occurs:

the recalculated timing is within the timing constraints;

the recalculated timing is the closest to the timing constraints as possible while still violating the timing constraints after a predetermined number of repetitions of steps 7A–7E;

(7G) determining an allowable location for each accepted new circuit element using the corresponding assigned location as an initial target.

4. The method of claim 3 wherein the step of synthesizing post-layout optimization circuitry causes the execution of at least one of the software modules that is also executed to synthesize the logic design of the integrated circuit.

5. The method of claim 3 wherein the layout of the at least one circuit element that implements the logic design remains substantially unchanged during steps (7A) through (7G).

* * * * *